United States Patent [19]

Simon

[11] 4,260,688
[45] Apr. 7, 1981

[54] FLAME-PROOFING OF FLEXIBLE POLYURETHANE FOAMED PLASTICS BY POST-TREATMENT USING AQUEOUS AMMONIACAL COMBINATIONS OF BENZENEPHOSPHONIC ACID/MELAMINE SALTS AND POLYMERIC CHLORINE-CONTAINING LATEX

[76] Inventor: Eli Simon, 7175 Little Harbor Dr., Huntington Beach, Calif. 92648

[21] Appl. No.: 120,087

[22] Filed: Feb. 8, 1980

[51] Int. Cl.$^3$ ............................................. C08G 18/14
[52] U.S. Cl. ............................... 521/54; 260/29.7 R; 260/29.7 H; 260/29.7 AT; 521/906
[58] Field of Search .................................. 521/54, 906; 260/29.6 HN, 29.7 H, 29.7 AT, 29.7 R

[56] References Cited

U.S. PATENT DOCUMENTS

| 3,686,067 | 8/1972 | Williams | 521/54 |
| 3,864,135 | 2/1975 | Kuehn | 260/29.6 HN |
| 4,061,605 | 12/1977 | Simon | 521/108 |

Primary Examiner—Maurice J. Welsh

[57] ABSTRACT

This invention relates to aqueous ammoniacal combinations of benzenephosphonic acid/melamine salts as flame-retardants and a polymeric chlorine-containing film-forming latex as a carrier for the flame-retardants, for the post-treatment of flammable flexible polyurethane foamed plastics to provide products that are self-quenching and substantially resistant to both flame-initiation and flame-propagation after free flame exposures.

3 Claims, No Drawings

FLAME-PROOFING OF FLEXIBLE POLYURETHANE FOAMED PLASTICS BY POST-TREATMENT USING AQUEOUS AMMONIACAL COMBINATIONS OF BENZENEPHOSPHONIC ACID/MELAMINE SALTS AND POLYMERIC CHLORINE-CONTAINING LATEX

BACKGROUND AND PRIOR ART

The problems associated with the flammability of flexible polyurethane foamed plastics are matters of acknowledged repeatable documentation of fires that became catastrophic because of the fueling and spreading effects of their pyrolyzed products which were readily meltable and readily combustible. The potential hazards of uncontrollable flammability have been compounded by the ubiquitous applications of these materials to household, industrial, aircraft, and military uses where low density, soft, flexible and compliant products are desired for insulation, bedding, cushions, furniture padding, etc.

To reduce the flammability and flame-propagation properties of these polyurethanes, selected flame-retardants of the type noted in my patent U.S. Pat. No. 4,061,605 titled "Reaction Products of Benzenephosphonic Acid and Melamine as Flame-Retardant Additives" may be incorporated as part of the foaming mixture. Although this is a practical, efficient insitu procedure for utilizing these "additives", their properties of limited aqueous solubilities and pronounced thickening and incipient gelling in water dictates against the suitability of aqueous solutions of these salts for the post-treatment of the foamed plastics in question.

The post application of a combination of modified benzenephosphonic acid/melamine salts (processed in accordance with the disclosure of this invention) and a film-forming latex as a carrier (in which the polymeric deposit is soft, flexible, and intrinsically flame-resistant) meets the objective of reducing involvement of the foamed plastic towards intensifying or propagating a fire following exposure to an igniting source such as a free flame, without unduly compromising the necessary physical properties of compressibility and flexibility inherent to their aforementioned uses.

Modification of the benzenephosphonic acid/melamine flame-retardants to the extent that they remain compatible when added to a selected latex carrier, is accomplished by increasing the pH of their acidic aqueous thickened states to a value from approximately 8 to 10 by the addition of ammonium hydroxide. Subsequent drying of the treated foamed plastic essentially restores the original physical properties of the retardant-salts that remain within the matrix of the polymeric carrier.

As objects of this invention, it is intended that: the applicability of the benzenephosphonic acid/melamine salts for the post-treatment of flexible polyurethane foamed plastics be disclosed; the procedure be delineated for the ammoniated modification of these flame-retardant salts; the preferred limits for the flame-retardant salts and the polymeric carrier be set-forth; an applicable, flame-resistant polymer latex carrier be described and identified; procedures for the post-treatment of the flexible polyurethane foamed plastics, using the ammoniated stabilized flame-retardant/latex carrier compositions of this invention, be presented that result in products that are substantially inert to flame-propagation after free flame exposure. These and other objectives and advantages will be apparent from the described concepts and results.

SUMMARY OF THE INVENTION

This invention discloses the use and defines the limits of stabilized flame-retardant benzenephosphonic acid/melamine salts dispersed in a latex, that deposits soft, rubbery, chlorine-containing polymeric films, for the post-treatment of flexible polyurethane foamed plastics to provide improved, substantially-reduced combustibility and flame-propagation after having been exposed to sources of open-flame ignition.

DESCRIPTION OF THE INVENTION

The mixtures of this invention, for the post-treatment of flexible polyurethane foamed plastics to impart flame-retardency, are comprised of aqueous ammoniated dispersions of the salts of benzenephosphonic acid and melamine in latexes of selected compositions as carriers. Examples of these selected latexes are DOW Chemical Company's carboxylated vinylidene chloride-butadiene copolymer systems described in their bulletin "DOW Carboxylated Vinylidene Chloride-Butadiene Latexes for Adhesives", published 1975, and in particular DOW XD-30208.01, a soft, rubbery film-forming carboxylated vinylidene/chloride latex; the latter will be described more fully as part of the discussion to follow.

The flame-retardant benzenephosphonic acid/melamine salts are identified in U.S. Pat. No. 4,061,605, prepared in aqueous media within the mol-percent range of $33\frac{1}{3}$ to 66#% of benzenephosphonic acid. As noted in the referenced patent, the ratio of two moles of benzenephosphonic acid to three moles of melamine and one mol of benzenephosphonic acid to two moles of melamine especially exhibit a pronounced thickening capacity when dispersed in water; this characteristic of incipient gelation in water in addition to their aqueous acidic pH's varying from approximately 2 to 4.7, renders them unsuitable, unless modified, as additives to the latex carriers in this specification. By ammoniating or adding aqueous ammonium hydroxide to the thickened or gelled states, a marked reduction in viscosity and an improvement in the fineness of the dispersion occurs at a pH greater than 7; at a pH of approximately 8, the mixture becomes "fluid" with a concomitant improved change in the reduction of particle size of the flame-retardant salts. The pH range for the purpose of this invention of the ammoniated mixtures lies between 8 and 10 and preferably is approximately 9.

As requirements for the latex carrier, the film deposited must have a soft "hand" so as not to impair unduly the physical properties of the foamed plastics, be flexible and rubbery, be water-resistant, and have intrinsic flame-resistance. These characteristics are met by DOW Chemical Company's latex XD-30208.01, identified as a carboxylated vinylidene/chloride having a solids content of 48%, a chlorine content of 36%, a particle size of 1400 A°, and a pH of 8.0.

The procedure found effective for incorporating the benzenephosphonic acid/melamine flame-retardant salts in the latex carrier involves the steps of dispersing the flame-retardant salt in water, adding concentrated ammonium hydroxide to a pH of approximately 9, adding the DOW XD-30208.01 latex, and adjusting the pH to about 9 again by the use of the aqueous ammonium hydroxide. The resultant mixtures having the properties of low viscosity and uniformity of particle dispersion, are eminently suitable for post-treatment of the flexible polyurethane foamed plastics to impart improved flame-retardancy.

The limited aqueous solubilities of the benzenephosphonic acid/melamine salts, varying from approximately 0.5 to 2.5 g./100 ml. of solution at 70° F., provides a distinct advantage when compared to the more conventional flame-retardant water-soluble compounds, such as the inorganic phosphates and borates, in their resistance to removal by leaching under conditions of high humidity. Significantly, the ammoniating process for reducing the viscosity and improving the dispersion in aqueous media does not necessarily impair the characteristics of limited solubility in water. Thus, for an ammoniacally-dispersed mixture of the salt of 1-mol benzenephosphonic acid to 2-moles of melamine at an adjusted pH of 8, the solubility was increased from approximately 0.5 to 0.7 g./100 ml. of solution; after dehydrating the recovered salt, it again imbibed water-of-hydration, thickening to a gelled-like matrix, and the pH of an aqueous saturated solution was approximately 4.8, each comparable to that for the original salt. Thus, ammoniation of aqueous thickened mixtures of the flame-retardant salts used in this invention permits the formation of low viscosity, uniformly dispersed compositions without necessarily weakening the desired advantage of relatively low aqueous solubility of the "retardant" deposited by the latex carrier onto and within the flexible foamed plastic.

For the purpose of this disclosure the flame-retardant benzenephosphonic acid/melamine salts are identified as reaction products between: 1-mol of benzenephosphonic acid (BPA) to 1-mol of melamine, or $(BPA)_1(melamine)_1$; 1-mol of BPA to 2-moles of melamine, or $(BPA)_1(melamine)_2$; 2-moles of BPA to 3-moles of melamine, or $(BPA)_2(melamine)_3$; 2-moles of BPA to 1-mol of melamine, or $(BPA)_2(melamine)_1$; and 3-moles of BPA to 2-moles of melamine, or $(BPA)_3(melamine)_2$. Those preferred primarily by reason of lesser aqueous solubilities are: $(BPA)_1(melamine)_1$; $(BPA)_1(melamine)_2$; $(BPA)_2(melamine)_3$; and $(BPA)_3(melamine)_2$.

Application of the coating mixtures, comprised of the flame-retardant salts and chlorine-containing latex at a pH of approximately 9 may easily and satisfactorily be accomplished either by adding the theoretical weight of the ammoniated dispersion to the flexible foamed plastic or by saturating the foamed plastic by immersion and subsequently reducing its thickness to retain the required final weight percentages of the additives. In the former procedure, i.e., by the direct limited weight addition of the latex mixture, the flexible foamed plastic is worked (compressed and released) to uniformly imbibe the aqueous dispersion. In the latter procedure, compressing the saturated foamed plastic to a predetermined thickness, the requirement is met for the consistent distribution of the fluid coating material throughout the body of the "foam", as is the need for the control of the weight percentages of the additives.

The flammability of the treated polyurethanes was evaluated by determining combustibility and flame-propagation after subjecting approximately $1\frac{1}{2}'' \times 1'' \times \frac{1}{4}''$ specimens to a Fisher burner flame and match flame as igniting sources. For the Fisher burner test, the entire specimen was held within the flame for 5 seconds; for the "match test", the free flame impinged on vertically-positioned specimens for time periods of 5 to 30 seconds. Acceptability of flame-retardency was predicated on "instant" self-quenching after removal of the igniting source. Extended testing of various additive (retardant and polymer solids) concentrations under the stipulated flammability procedures indicated effective but marginal flame-retardency at approximately 20 weight percent each of the flame-retardant salt, categorized as $(BPA)_x(melamine)_y$, and the DOW XD-30208.01 polymer solids, based on the final total weight of the foamed plastic. Increasing the additive percentages to 25 wt. % of each significantly enhanced the margin of safety from flame-propagation. But the optimum properties of markedly lowered combustibility and "instant" self-quenching, without unduly sacrificing the original physical properties of the foamed plastic, is achieved by altering the ratio between the $(BPA)_x(melamine)_y$ salts and the latex solids while increasing slightly the wt. % of the flame-retardant salts. Thus, based on the weight of the treated foamed plastic, a range of 25 to 40 wt. % (and preferably 30 to 35 wt. %) of $(BPA)_x(melamine)_y$ and a weight ratio of more than 1 for $(BPA)_x(melamine)_y$: DOW XD-30208.01 solids (and preferably latex solids of 50 to 75% of the flame-retardant salts) provides superior flame-retardation and reduced combustibility to the flexible polyurethane foamed plastics.

These and other considerations will be substantiated, expanded, and clarified by the examples set forth.

EXAMPLES OF THE INVENTION

Example 1

In this example (as noted in Table 1), the additive weight percentages were varied and controlled by the method of thickness reduction after saturating the flexible polyurethane foamed plastic in a mixture of 30 g. of flame-retardant, $(BPA)_1(melamine)_2$, 200 ml. dist. water, and 41.67 g. DOW XD-30208.01 (equivalent to approximately 20 g. of solids), adjusted to a pH of about 9 by the use of concentrated ammonium hydroxide after the separate stages of dispersing the flame-retardant salt in water and adding the latex carrier.

TABLE 1

| Percent Thickness Reduction Of Foamed Plastic | Additive Weight Percentages (Based On The Final Weight Of The Treated Foamed Plastic) | |
|---|---|---|
| | $(BPA)_1(melamine)_2$ | DOW XD-30208.01 Solids |
| None | 52% | 35% |
| 25% | 48% | 32% |
| 50% | 43% | 29% |
| 62.5% | 38% | 25% |
| 75% | 33% | 22% |
| 87.5% | 27% | 18% |

In each of the thickness reduction cases, a ratio of approximately $\frac{2}{3}$ between the polymer solids and the flame-retardant salt was maintained, matching the original coating composition, indicating uniformity of the dispersion and the capability of establishing a repeatable, reliable procedure of controlling the additive percentages by the method of "thickness reduction". The values given in Table 1 are illustrative only of the method of post-treatment and are not meant to define or limit the scope of the disclosure.

Example 2

Mixtures of flame-retardant salts and DOW XD-30208.01 latex were prepared, in accordance with the concept of this invention, by adjusting the pH's to approximately 9 using aqueous ammonium hydroxide. These were subsequently applied to treat 1.5 and 4#/cu. ft. flexible polyurethane foamed plastics at varying additive weight percentages, by the methods of "theoretical weight additions" and "thickness reduction", for evaluation of combustibility and flame-propagation after being subjected to Fisher burner and match flames as ignition sources. The mixtures, each ammoniated to a pH of approximately 9, comprised:

I—containing 15 g. $(BPA)_x(melamine)_y$, 100 ml. water(dist.), and 20.835 g. DOW XD-30208.01 latex (equivalent to about 10 g. polymer solids), where:
    #I-1—contains $(BPA)_1(melamine)_2$
    #I-2—contains $(BPA)_1(melamine)_1$
    #I-3—contains $(BPA)_2(melamine)_1$
    #-4—contains $(BPA)_2(melamine)_3$, and
    #I-5—contains $(BPA)_3(melamine)_2$

II—containing 20 g. $(BPA)_x(melamine)_y$, 100 ml. water, and 20.835 g. latex of #I, where:
    #II-1—contains $(BPA)_1(melamine)_2$, and
    #II-2—contains $(BPA)_1(melamine)_1$

III—containing 10 g. $(BPA)_x(melamine)_y$, 100 ml. water, and 20.835 g. DOW XD-30208.01 latex, where:
    #III-1—contains $(BPA)_1(melamine)_1$
    #III-2—contains $(BPA)_1(melamine)_2$, and
    #III-3—contains $(BPA)_2(melamine)_1$

IV—containing 3.85 g. benzenephosphonic acid and 6.15 g. melamine (replacing 10 g. of $(BPA)_1(melamine)_2$ as the fire-retardant), 100 ml. water, and 20.835 g. DOW XD-30208.01 latex.

V—containing 15 g. diammonium hydrogen phosphate, or $(NH_4)_2HPO_4$, as fire-retardant replacement for $(BPA)_x(melamine)_y$ in the #I mixtures, 100 ml. water, and 20.835 g. of the #III latex.

For the mixtures of numbers I—V inclusive, flexible polyurethane foamed plastics of densities 1.5 and 4 lbs./cu.ft. were selectively treated using both methods, previously discussed, for adjusting and controlling the weight percentages of the additives, followed by drying (or dehydration) including a combination of air exposure and oven heat at a maximum of 120° C. The results of these experiments are summarized as follows:

I—Test Specimens

| Additive | Weight Percent of Additives, Based on the Total Weight of the Treated Foamed Plastic |
|---|---|
| $(BPA)_x(melamine)_y$ | 29 to 31 |
| DOW XD-30208.01 solids | 19 to 21 |

Flammability

Fisher Burner Flame—ignition source (5 second exposure)

No flame propagation; "instant" self-quenching after removal from the free flame; substantially diminished melting of the foamed plastics during ignition source exposure.

Match Flame—ignition source (vertical burn)

"Instant" self-quenching, ie., no flame propagation after 3-periods of 10 seconds each exposure and 1-period of 30 seconds exposure. Also, substantially diminished melting of the plastic during the free flame exposure. By constrast, untreated Controls of the foamed plastics continued to burn vigorously after momentary contact with the ignition sources, as did the melt products, an obvious contributing factor in helping to propagate combustion.

II—Test Specimens

| | Weight % Additives |
|---|---|
| $(BPA)_1(melamine)_2$ | approximately 30 |
| $(BPA)_1(melamine)_1$ | approximately 30 |
| DOW XD-30208.01 solids | approximately 15 |

Flammability

Absence of flame propagation similar to the #I—test results after exposure to the Fisher burner flame and match flame for time periods and under equivalent conditions for evaluation.

III—Test Specimens

Additive concentrations included 24 wt. % each of the retardant $(BPA)_x(melamine)_y$, ie., $(BPA)_1(melamine)_1$, $(BPA)_1(melamine)_2$, and $(BPA)_2(melamine)_1$, and DOW XD-30208.01 solids—Type A specimens; and 30 wt. % each $(BPA)_x(melamine)_y$ and DOW XD-30208.01 solids—Type B specimens.

Resistance to flame propagation, after exposure to the Fisher burner flame and match flame ignition sources, was better for the Type B as compared to the Type A specimens. All of the samples evidenced strong self-quenching capabilities, but were significantly more limited in safety from flame-propagation when tested for vertical burn using a free match flame as the igniting source, particularly for exposures in excess of 5 seconds. The higher concentration of the latex carrier in Type III as compared to the Type I and Type II specimens, containing equivalent weight percentages of $(BPA)_x(melamine)_y$, appears the determining factor in the variance of their flammability behaviors, emphasizing the importance of the ratio of the flame-retardant $(BPA)_x(melamine)_y$ salts to the latex polymer solids in the additive package.

IV—Test Specimens

| | Weight % Additives |
|---|---|
| Benzenephosphonic acid + Melamine | 25 |
| DOW XD-30208.01 solids | 25 |

Flammability

Comparison with treated "foams" containing $(BPA)_x(melamine)_y$ and DOW XD-30208.01 at comparable weight percentages showed more pronounced combustibility and flame-propagation when the benzenephosphonic acid and melamine were separately present (in contrast to their reaction product salts), tested using both the Fisher burner flame and match flame as ignition sources. The "match flame-vertical burn" procedure especially demonstrated that the salt of $(BPA)_x(melamine)_y$ has more effective flame-retardency that a comparable weight of its components, verifying the conclusion in U.S. Pat. No. 4,061,605.

V—Test Specimens

|  | Weight Percent of Additives | |
|---|---|---|
|  | Type A | Type B |
| (NH$_4$)$_2$HPO$_4$ | 29 | 40 |
| DOW XD-30208.01 solids | 19 | 27 |

Flammability

Although Type B specimens showed some improvement in flame-retardation over the Type A specimens, both were not comparably effective in their absence of burning or self-quenching after free flame exposures when compared to the #I samples containing equivalent weight percentages of retardant as (BPA)$_x$(melamine)$_y$ and DOW XD-30208.01 solids. The distinguishing difference appeared to be the behavior under the vertical burn match-flame test in which the Type I specimens satisfactorily self-extinguished after each of three consecutive 10 second ignition exposure intervals and one separate interval of 30 seconds, whereas the Type V test samples continued to propagate combustion after only a single 10 second match flame exposure.

EXAMPLE 3

In this example, the effect of a sustained humidified atmosphere on the subsequent flammability of treated flexible polyurethane foamed plastics containing the flame-retardants (BPA)$_1$(melamine)$_2$ and (NH$_4$)$_2$HPO$_4$ was compared.

|  | Weight Percent of Additives | | |
|---|---|---|---|
|  | #I Type of | #V Specimens | |
| Additive | Specimen | Type A | Type B |
| (BPA)$_1$(melamine)$_2$ | 29 | — | — |
| (NH$_4$)$_2$HPO$_4$ | — | 29 | 40 |
| DOW XD-30208.01 solids | 19 | 19 | 27 |

Approximately 1½"×1"×¼" sections of the treated plastics (Type #I and Type V—A and B) were suspended for 8 hrs. over distilled water heated to 100° F. in a semi-closed environment. The cover of the chamber was so arranged that the condensate dripped onto the treated foamed plastic sections. The system was then allowed to cool gradually during a period of 16 hours, during which time the foams were subjected to a humidified atmosphere approaching 100% relative humidity. Prior to flammability testing, the test samples were dried in an oven at 100° C.

Flammability

There appeared to be no significant impairment of flame-retardency by the #I type specimen containing 29 wt. % (BPA)$_1$(melamine)$_2$ and 19 wt. % "latex" solids; thus after a 30 second match flame exposure, there was again "instant" self-quenching, comparable to its performance prior to humidity soak.

For both of the Type V specimens (A and B) containing (NH$_4$)$_2$HPO$_4$, there were noticeable increases in flammability as a result of the preconditioning in the humidified environment, particularly by the match-flame vertical test, demonstrating the advantage of the limited water solubility of the (BPA)$_x$(melamine)$_y$ salts as flame-retardants.

I claim:

1. Aqueous mixtures of the salts of benzenephosphonic acid and melamine as flame-retardants made ammoniacal to a pH of 8 to 10 wherein the mol percentage of benzenephosphonic is within the range of 33⅓ to 66⅔ mol percent, and a carboxylated vinylidene chloride-butadiene copolymer latex having a chlorine content of approximately 36% and a pH of approximately 8 as a carrier for the flame-retardant salts, in weight ratios of flame-retardant salts to polymeric carrier solids from 1.5 to 1 to 2.0 to 1 respectively, for the post-treatment of flexible polyurethane foamed plastics to impart reduced combustibility and improved flame-retardency.

2. Flexible polyurethane foamed plastics treated with the aqueous ammoniacal combinations of claim 1 in amounts to contain 25 to 40 weight percent of the flame-retardant salts and chlorine-containing copolymer carrier solids of from 50 to 75 percent of the flame-retardant salts, based on the total weight of the treated foamed plastic, so as to be self-extinguishing and substantially non-flammable.

3. Flexible polyurethane foamed plastics treated with the aqueous ammoniacal combinations of claim 1 in an amount so as to be self-extinguishing and substantially non-combustible.

* * * * *